April 18, 1933.   C. McLAREN   1,904,499
INTERNAL COMBUSTION ENGINE
Filed July 22, 1929   3 Sheets-Sheet 3
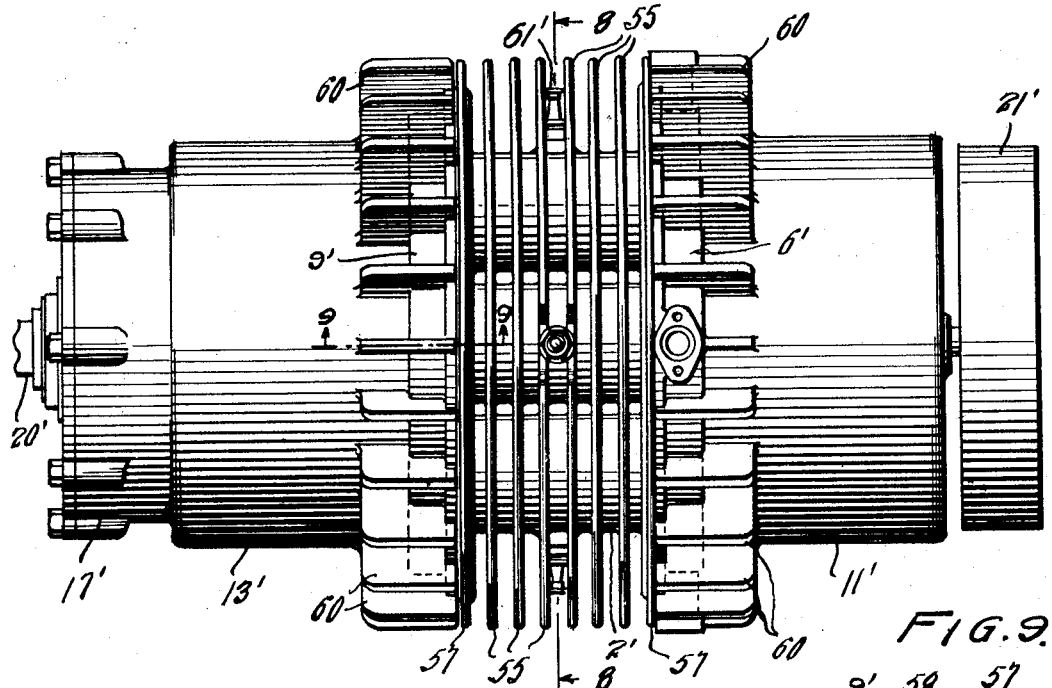
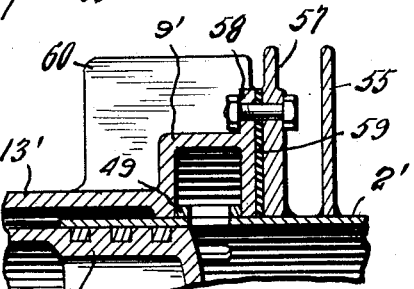
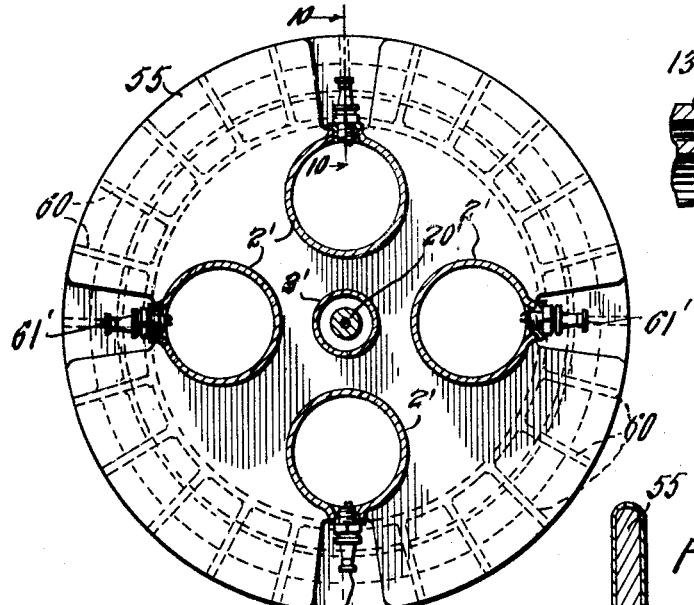
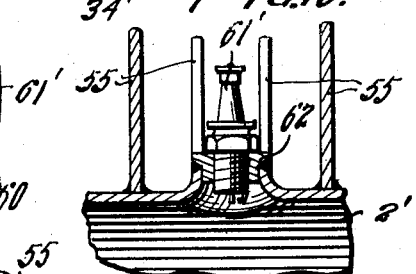
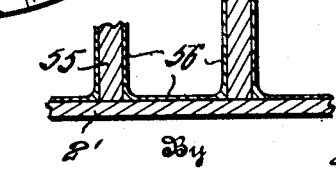

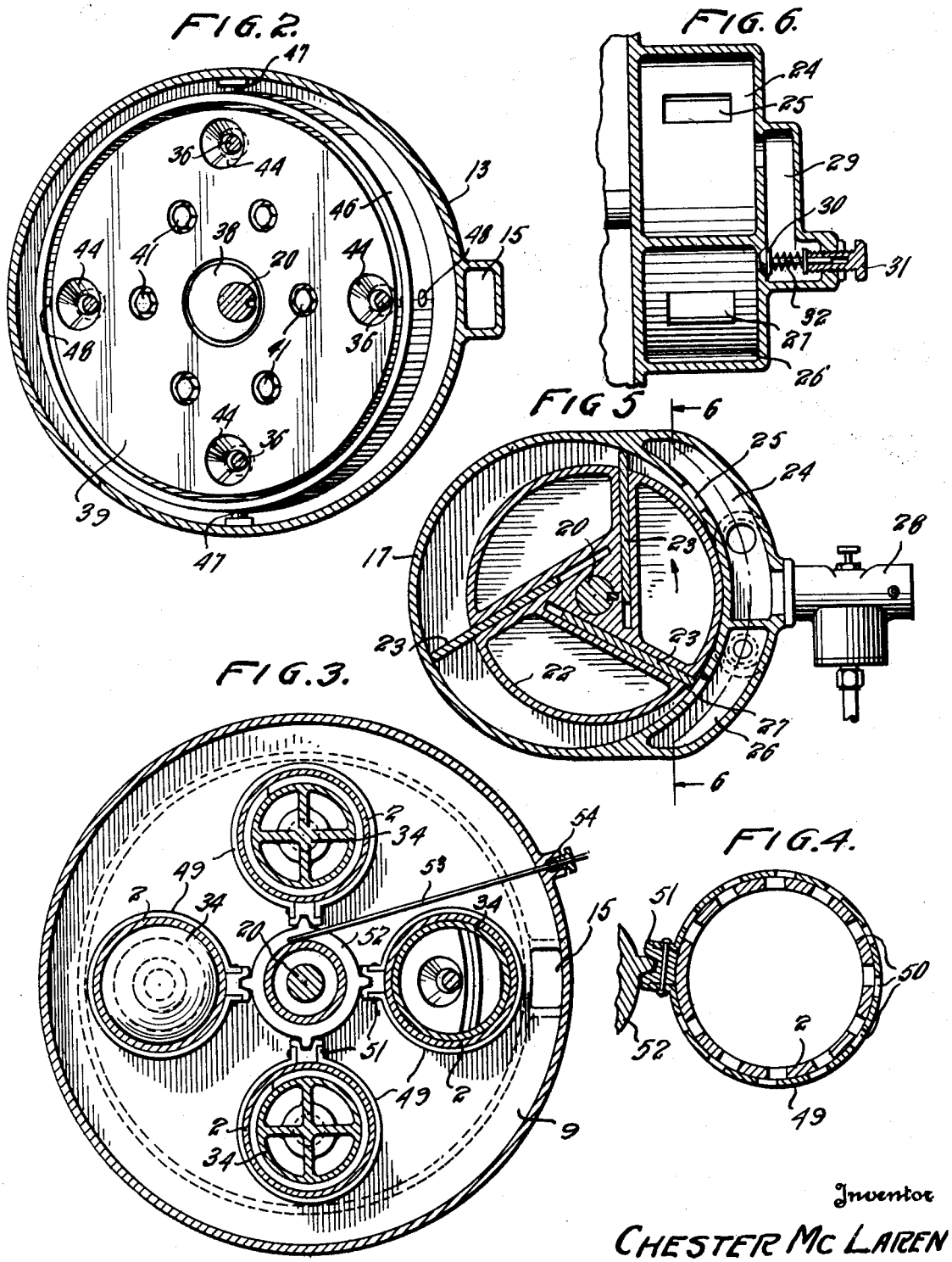

Patented Apr. 18, 1933

1,904,499

UNITED STATES PATENT OFFICE

CHESTER McLAREN, OF EL CENTRO, CALIFORNIA

INTERNAL COMBUSTION ENGINE

Application filed July 22, 1929. Serial No. 379,940.

This invention relates in general to internal combustion engines and more particularly has reference to internal combustion engines operating on a two-stroke cycle and of the type wherein two opposite pistons operate in each cylinder and are associated with a shaft parallel with the axes of the cylinders, so as to impart rotary motion to the shaft.

Internal combustion engines of the general type to which this invention relates have been proposed heretofore. Because of the inherent characteristics of this type of engine; that is, lightness, compactness, simplicity, freedom from vibration common to engines of the reciprocating form of construction, and because of the absence of valves, cranks, cams and operating gear shafts, chains, etc., engines of this type are very desirable for use in many and varied installations.

Many internal combustion engines operating on the two-stroke cycle are controlled as to speed by advancing or retarding the timing of the ignition; others, and perhaps the majority, are controlled by interposing a valve in the conduit for supplying the engine with the fuel mixture. It will be appreciated that the first mentioned method of control is decidedly uneconomical and detrimental to the efficient operation of the engine. Controlling the speed of the engine by varying the supply of fuel mixture admitted to the cylinder reduces the efficiency of the engine.

In most of the engines operating on a four-stroke cycle the charge is drawn into the cylinder upon the suction stroke of the piston. Also, in many internal combustion engines operating on the two-stroke cycle, the charge is drawn into the crankcase by the low pressure created by the movement of the piston and is then forced into the cylinder by pressure in the crankcase, due to movement of the piston. If in these types of engine the quantity of the charge is reduced by throttling at the carburetor or mixing valve; that is, by restraining the flow of the mixture to the cylinder upon the suction stroke, the pressure in the cylinder or in the crankcase on the suction stroke will be reduced lower than it would be if the fuel could be freely drawn into the cylinder or crankcase.

Under these conditions, which exist in every internal combustion engine, the speed of which is controlled by throttling the fuel mixture, the piston will travel on the compression stroke a considerable distance before any compression of the mixture takes place. Consequently the pressure in the cylinder does not reach the value upon which the engine was designed to operate.

It is obvious that if the pressure upon which an internal combustion engine is designed to operate is not obtained, the operation of the engine will be very inefficient. This disadvantage is present in the majority of the engines heretofore employed. While many attempts have been made to increase the efficiency of engines heretofore employed, there have not as yet been any revolutionizing developments.

A major object of this invention is to devise an internal combustion engine which avoids the disadvantages inherent in the engines heretofore constructed.

Another object of this invention is to devise an internal combustion engine of the opposed piston type operating on the two-stroke cycle, which avoids the disadvantages hereinbefore pointed out.

Yet another object of this invention is to devise an internal combustion engine in which the operating pressure prior to ignition of the charge remains substantially constant regardless of the speed of the engine.

Still another object of this invention is to devise an internal combustion engine which operates on a cycle in which there is no suction stroke.

A further object of this invention is to devise an internal combustion engine in which the flow of the fuel mixture to the cylinder is controlled directly at the cylinder.

A still further object of this invention is to devise an internal combustion engine of the type in which each cylinder is provided with a pair of opposed pistons connected to a shaft arranged parallel with the axes of the cylinders by means of wabble plate constructions and which accomplishes the objects hereinbefore set forth.

With these and other objects in view, which may be incident to my improvements, the invention consists in the parts and combinations to be hereinafter set forth and claimed, with the understanding that the several necessary elements comprising my invention may be varied in construction, proportions and arrangements without departing from the spirit and scope of the appended claims.

An internal combustion engine constructed in accordance with the present invention comprises a group of cylinders arranged en bloc about a power shaft the axes of the cylinders being parallel with the shaft. Mounted in each cylinder is a pair of pistons, which are connected by suitable connecting rods with wabble plates cooperatively associated with the power shaft. Each cylinder is provided with a plurality of fuel mixture intake ports adjacent one end thereof and with a plurality of exhaust ports adjacent the other end thereof. The intake ports communicate with an intake manifold, and the exhaust ports communicate with an exhaust manifold.

Each cylinder is provided with a sleeve or collar positioned about the intake ports and provided with a plurality of ports corresponding to those in the cylinder. These sleeve or collars serve as valves for regulating the supply of fuel admitted to the cylinders. All of the valve members are interconnected so that they may be operated simultaneously by a single control device.

Associated with the power shaft is a moving element of a blower, the inlet side of which is connected with a carburetor or mixing valve, and the outlet or high pressure side of which is in communication with the intake manifold for supplying fuel to the cylinders. A suitable by-pass connection is provided between the low and high pressuer sides of the blower for varying the pressure in the fuel intake manifold.

In order to make my invention more clearly understood, I have shown, in the accompanying drawings, means for carrying the same into practical effect without limiting the improvements in their usual applications to the particular constructions which, for the purpose of explanation, have been made the subject of illustration.

In the drawings:

Figure 2 is a sectional view taken on line 2—2 of Figure 1, showing the wabble plate construction.

Figure 3 is another sectional view taken on line 3—3 of Figure 1, showing the cylinder arrangement and the fuel mixture control mechanism.

Figure 4 is a detailed view of the sleeve or collar valve construction.

Figure 5 is a sectional view taken on line 5—5 of Figure 1, showing the pump or blower mechanism for forcing the fuel mixture into the cylinders of the engine.

Figure 6 is a sectional detail taken on line 6—6 of Figure 5.

Figure 7 is an elevational view showing a modified form of my invention.

Figure 8 is a sectional view taken on line 8—8 of Figure 7.

Figure 9 is a detailed constructional view of the modified form of the invention.

Figure 10 is a view taken on line 10—10 of Figure 8, showing the manner in which the spark plugs are mounted in the cylinder walls.

Figure 11 is an enlarged detail of the fin construction and the manner of retaining the fins in their assembled positions.

Figure 1:
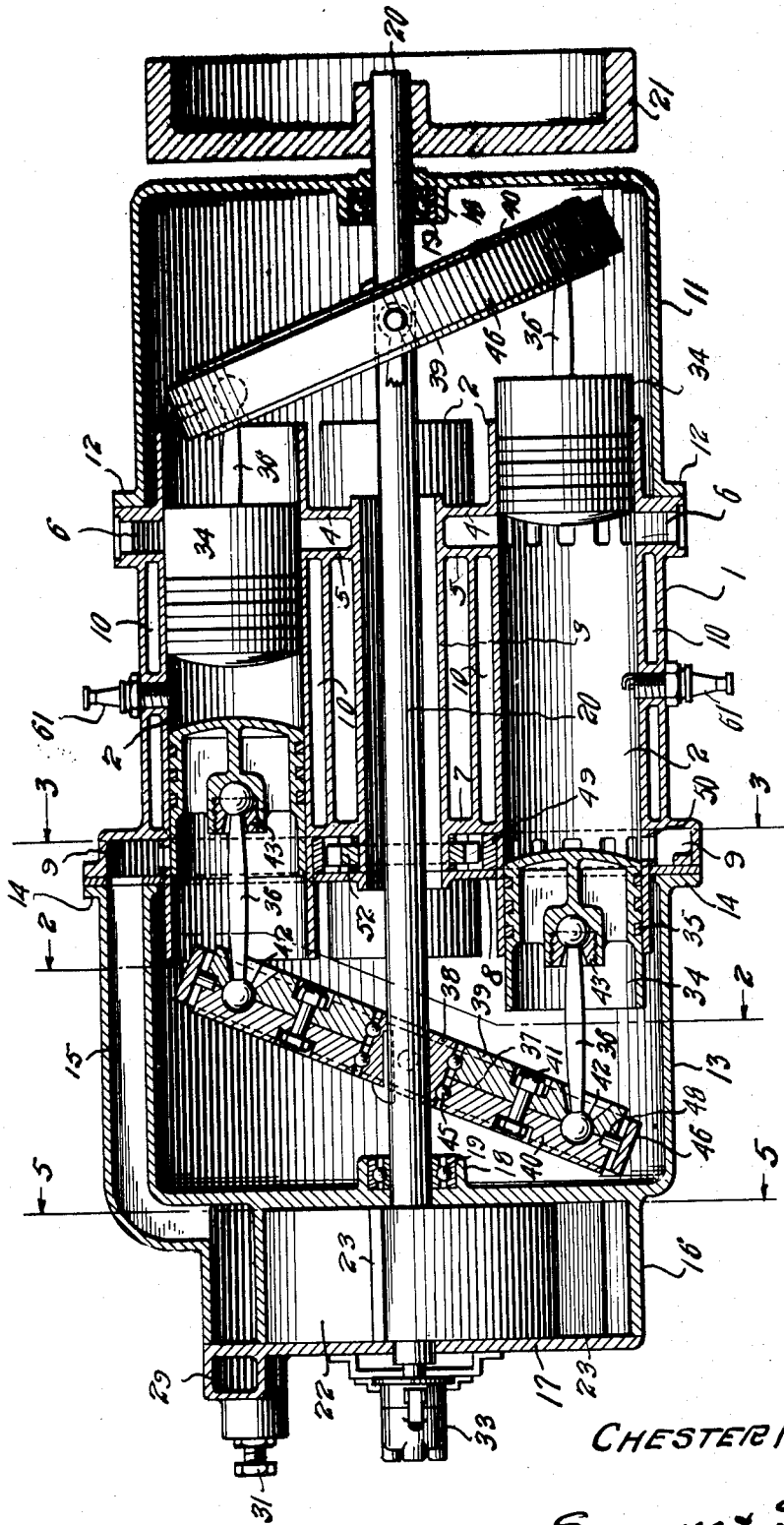
Figure 1 is a sectional view of an internal combustion engine constructed in accordance with the present invention.

Referring to the drawings, in which similar parts are indicated by similar reference characters throughout the several views, there is shown an internal combustion engine 1 constructed in accordance with the present invention. A plurality of cylinders 2 are arranged parallel to a tubular member or sleeve 3, about which the cylinders 2 are disposed and from which they are equidistantly spaced, as is clearly shown in Figures 1 and 3. The cylinders 2 and sleeve 3 are maintained in position at one end by plate-like members 4 and 5, between which is formed an exhaust conduit or manifold 6. At the other end the cylinders 2 and sleeve 3 are maintained in position by plate-like members 7 and 8, between which is formed a passageway 9, serving as a fuel intake manifold.

As shown in Figure 1, the cylinders 2 are surrounded by jackets 10, through which a suitable cooling medium may be circulated to maintain the parts of the engine at an operative temperature. It will be appreciated that the arrangement just described provides an en bloc construction, which is desirable for many reasons.

Detachably secured to the cylinder block; that is, to plate-like member 4, is a casing or housing 11, which serves as a housing for the moving mechanism and as a support for the power shaft of the engine. The casing 11 is provided with an annular flange 12, by means of which the casing is secured to the cylinder block. Another casing or housing 13, somewhat similar to casing 11, is detachably secured to the other end of the cylinder block by means of the annular flange 14.

This housing differs from housing 11 in that a fuel mixture conduit 15 is associated therewith, so as to communicate with the intake manifold 9. Conduit 15 communicates with the housing 16 of a suitable pump or blower 17 carried by the casing 13.

Each of the housings or casings 11 and 13 is provided with a central opening about which is positioned a flange 18, in which is received an element of a ball bearing assembly 19. Extending through the openings in the housings and rotatively supported by the bearing assemblies 19 is a power shaft 20, which is operatively connected with moving elements of the engine to be hereinafter described. A suitable flywheel and/or pulley 21 is fixedly mounted on one end of the shaft 20. On the other end of the shaft is a moving element 22 of the pump or blower 17.

The pump or blower construction 17 is more clearly shown in Figures 5 and 6 of the drawings. As shown in these figures, the pump is of the sliding blade type; that is, of the type in which the moving element 22 is mounted eccentrically with respect to the casing. In order to trap a fluid and force it out of the casing under pressure, a plurality of sliding blades 23 are mounted in the rotor 22. These blades are retained in engagement with the wall of the casing by any suitable means. An intake chamber 24 communicates with the casing 16 through a port 25, and an outlet or exhaust chamber 26 communicates with the blower casing through a port 27. Chamber 24 has a carburetor 28 of any design and construction suitable for the purpose connected thereto for supplying a fuel mixture to the engine. After the fuel mixture is placed under pressure, it is forced into chamber 26 and thence into the fuel mixture conduit or duct 15.

In accordance with the present invention a by-pass duct 29 provides a communicating connection between the chambers 24 and 26. The walls of the port placing chamber 26 in communication with duct 29 is shaped to provide a seat for a valve 30. This valve is provided with a stem which is slidably received in a threaded bushing 31. A coil spring 32 is positioned on the valve stem and is arranged between the valve body and the end of the bushing to urge the valve on its seat.

The spring 32 may be of any desired strength, so as to force the valve 30 onto its seat with a predetermined pressure. The pressure exerted on the valve may be adjusted by rotating the threaded bushing 31 so as to increase the tension in the spring 32. With this construction, pressure between the exhaust and the intake chambers 26 and 24 may be adjusted as desired. For instance, when only a small amount of fuel is required by the engine, valve 30 may be adjusted so that the fuel mixture may flow freely from chamber 26 into the chamber 24.

The shaft 20, which may be either solid or hollow, is provided with an extension projecting through the end of the pump housing 16. The extended portion of this shaft is associated with the movable element of a distributor 33 in the ignition system for supplying energy to the several spark plugs 61 arranged in the cylinders of the engine.

Each of the cylinders 2 has a pair of pistons 34 reciprocally mounted therein. These pistons are provided with the usual piston rings 35 for effecting a tight joint between the pistons and the cylinder walls, so as to prevent the loss of compression from the cylinders. The pistons are connected by means of suitable connecting rods 36 with a wabble plate construction 37, which in turn is associated with the power shaft 20, so as to impart rotary motion thereto. Shaft 20 has a cylindrical member 38 secured thereto adjacent each end of the internal combustion engine. This cylindrical member is angularly arranged with respect to the shaft and is adapted to transmit motion from the wabble plate construction 37 to the shaft 20.

Each of the wabble plates consists of a plurality of plates 39 and 40 secured together by a plurality of bolts or other effective securing means 41. Plate 40 has a plurality of half spherical sockets formed therein adapted to receive the ball ends 42 of the connecting rods 36. The ball ends 42 of the connecting rods are held in the sockets by means of the plates 39, which are also provided with half sockets adapted to cooperate with the half sockets in plate 40. Openings 44, communicating with the sockets in plate 39, are provided, through which the connecting rods 36 extend. The other ends of connecting rods 36 are equipped with balls, which are received in sockets in the pistons 34 and are held in place by threaded retainers 43.

The wabble plate construction is rotatably mounted on the member 38, preferably by ball bearings 45 or roller bearings, depending upon the particular construction desired. It will be appreciated that if the shaft 20 and the cylindrical members 38 are rotated, and the wabble plate construction is maintained rotatably stationary, any particular portion of the plate will move in a path substantially parallel to the axis of shaft 20. Consequently, by applying a reciprocating force to a particular portion of the wabble plate and causing that portion of the plate to move in a path substantially parallel to the axis of shaft 20, rotary motion may be imparted to this shaft. With the block of four cylinders the motion imparted to the shaft will be much smoother.

In order to maintain the wabble plates rotatably stationary with respect to the cylinder blocks, a suitable supporting structure is provided. This structure consists of a band 46 provided with openings spaced about the band an angular distance of ninety degrees. One set of these openings; that is, a pair of oppositely disposed openings, cooperates with pivots or lugs 47 carried by the housings 11 and 13 to rockably support the band. The other set of openings of each band 46 has pins 48 associated therewith and with the wabble plate construction to rockably support the wabble plate relative to the band 46.

With the construction of the band 46 and the wabble plates just described, the wabble plates will be universally mounted with respect to the several casings, but will not be permitted to rotate with respect thereto.

Surrounding each cylinder about the intake ports and within the intake manifold 9 is a sleeve or collar 49 having a plurality of circumferentially spaced openings 50 corresponding in number and size to those provided in the cylinders. These collars or sleeves may be constructed as shown in the drawings or of any other suitable design. The ported sleeves or collars, which are rotatively mounted on the cylinders, serve as valves for regulating the size of the port openings in the cylinder walls and the amount of fuel mixture supplied to the cylinders.

Each of the sleeves or collars is provided with a grooved element 51 adapted to cooperate with projections or teeth carried by a bushing 52 rotatively mounted on the tubular member 3. The bushing 52 may be actuated by any suitable means which, for purposes of illustration, is shown as a rod 53 extending through an opening in the casing of the engine, about which is positioned a suitable packing gland 54.

It will be appreciated that by actuating the rod 53, the bushing 52 will rotate, which in turn will simultaneously rotate each of the sleeves 49 to bring the openings in the sleeves and cylinders into and out of registry to control the flow of fuel to the cylinders.

It is desirable to so position both of the cylindrical members 38 on the shaft 20 that the two pistons in each cylinder will operate in opposition to each other. Thus when there is an explosion in each cylinder, the force will operate between two movable pistons rather than between a movable piston and a stationary cylinder as in most types of engines. This action tends to reduce vibration to a minimum.

In operation the carburetor is supplied with air and fuel, which are mixed in the proper proportion and drawn by the pump or blower and forced through duct 15 into the manifold 9. When the pistons in a cylinder are in the position shown at the lower portion of Figure 1, a charge of fuel mixture will be forced into the cylinder displacing or scavenging the exhaust gases from the cylinder through the exhaust ports into the manifold 6. The pump preferably has a capacity sufficient to force a full charge into the cylinder. As the shaft 20 further rotates, the pistons move toward each other closing the port openings and compressing the charge. At the proper point of travel of the pistons the charge is ignited, effecting rapid combustion of the charge and tending to force the pistons apart. In their movement apart power is transmitted to the wabble plate and in turn is transmitted into rotary motion of the shaft 20.

If it is desired that the engine operate at a lower speed or power output than the maximum, the rod 53 is actuated to effect movement of the collar valves 49, which reduces the port opening. With the port opening reduced, the quantity of fuel mixture forced into the cylinder will be less. Therefore the mixture in the cylinder will be part burned gas and part combustible fuel mixture. This mixture, when ignited, will impart less force to the pistons, resulting in a slower speed of the engine or in a lower power output. However, since the fuel is forced into the cylinders rather than being drawn into them, the pressure in the cylinders will remain substantially constant, regardless of the amount of fuel supplied to the engine.

If, in operation, the pressure on the fuel mixture is too great for the speed or power output of the engine, the by-pass valve will operate to relieve the pressure. Of course, the speed and power output may be controlled by regulating this valve.

The engine just described and shown in Figures 1 to 6 of the drawings is adapted to be cooled by circulating a cooling medium in the jacket provided therefor about the cylinder walls. In Figures 7 to 11, however, I have shown a modified form of engine; that is, one that is air-cooled. The constructional details of this engine are identical with the other form, except for the cylinders. Parts of this modified form of engine corresponding to those shown in the other form of engine are indicated by similar reference numerals.

As shown in the drawings, the cylinders are in the form of tubes 2', which are positioned about a central tube 3' as in the case of the form of engine shown in Figures 1 to 6. The several tubes are held in an en bloc formation by means of a plurality of fins or plates 55, provided with openings to receive the tubes. The fins or plates are suitably spaced on the cylinders and are secured in place by welding or in any other effective manner. I have found that the radiating effect of the fins 55 can be increased and the fins securely held in place on the tubes or cylinders 2' and 3' by plating the assembled cylinder block construction. As shown in Figure 11, the plated coating 56 securely bonds the fins to the cylinders, which provides for greater rigidity and greater heat conduction from the cylinder to the fins. Particularly good results may be obtained by forming the parts of steel and copper plating them.

Adjacent each end of the cylinder block is mounted a relatively thick fin 57, by means of which the end casings 11' and 13' are secured to the block. In this form of my invention the housings or casings 11' and 13' are somewhat different from those shown in Figures 1 to 6, in that the intake manifold 9' and the exhaust manifold 6' are carried by the end casings rather than by the cylinder block. Each casing is provided with a flange 58 adapted to be secured to the flanges 57 carried by the cylinder block, suitable gaskets 59 being interposed therebetween.

Flanges 60 are arranged adjacent the manifolds to cooperate with the cooling fins to effect dissipation of heat from the engine. Spark plugs 61' may be mounted in the cylinders by providing a flanged aperture therein, in which is secured a bushing 62 internally threaded to receive a spark plug.

The moving parts of the engine shown in Figures 7 to 11 are identical with those described in connection with the engine shown in Figures 1 to 6, and the operation is substantially the same.

It will be appreciated that I have provided an internal combustion engine which is compact, relatively simple in construction, of light weight and in which vibration is reduced to a minimum. Also an engine constructed in accordance with this invention may be efficiently operated at various speeds and power outputs.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. An internal combustion engine comprising a rotary shaft, a plurality of cylinders spaced about said shaft and arranged with the axes of said cylinders parallel to said shaft, a pair of balanced pistons in each cylinder, means for imparting rotary motion to the shaft from the pistons, an inlet port adjacent one end of the cylinder at a point approximating that of the end of travel of one of said pistons and an exhaust port adjacent the other end of the cylinder at a point approximating that of the end of travel of the other piston and means for supplying fuel under pressure to said cylinder, said last mentioned means comprising a rotary pump associated with said shaft and a sleeve having openings associated with the inlet ports of said cylinders for controlling the supply of fuel admitted to said cylinders.

2. An internal combustion engine comprising a rotary shaft, a plurality of cylinders spaced about said shaft and arranged with the axes of said cylinders parallel to said shaft, a pair of balanced pistons in each cylinder, means for imparting rotary motion to the shaft from the pistons, an inlet port adjacent one end of the cylinder at a point approximating that of the end of travel of one of said pistons and an exhaust port adjacent the other end of the cylinder at a point approximating that of the end of travel of the other piston and means for supplying fuel under pressure to said cylinder, said last mentioned means comprising a rotary pump associated with said shaft and a sleeve having openings associated with the inlet ports of said cylinders for controlling the supply of fuel admitted to said cylinders and means associated with the sleeve for simultaneously controlling the supply of fuel to all of said cylinders.

3. In an internal combustion engine, a rotatable shaft, a plurality of cylinders arranged in parallel relation to said shaft, a pair of balanced pistons in each cylinder, and means for imparting rotary motion to the shaft from the pistons, a pump for compressing the fuel mixture and charging the same into said cylinders, said pump comprising a rotor mounted upon said shaft, a casing surrounding said rotor, a fuel intake chamber and a fuel exhaust chamber in said casing communicating with the interior thereof, an intake conduit connecting the exhaust chamber of said pump with said cylinders for conducting the fuel mixture thereto, and means associated with said pump for controlling the pressure and volume of each fuel mixture charge injected into the intake conduit.

4. In an internal combustion engine, a rotatable shaft, a plurality of cylinders arranged in parallel relation to said shaft, a pair of balanced pistons in each cylinder, and means for imparting rotary motion to the shaft from the pistons, a pump for compressing the fuel mixture and charging the same into said cylinders, said pump comprising a rotor mounted upon said shaft, a casing surrounding said rotor, said casing being provided with a fuel intake chamber and an exhaust chamber communicating with the interior thereof, a by-pass conduit connecting said chambers, means for by-passing the compressed fuel left from the exhaust chamber into the intake chamber when the pressure therein reaches a predetermined amount, and means for conducting the compressed fuel mixture from the exhaust chamber of said pump to said cylinders.

5. In an internal combustion engine having a rotatable shaft, a plurality of cylinders arranged in parallel relation thereto, a pair of balanced pistons in each cylinder, and means for imparting rotary motion to the shaft from the pistons, a pump for compressing the fuel mixture admitted to said cylinders, said pump comprising a rotor mounted upon said shaft, a casing for said rotor, said casing having an intake chamber and exhaust chamber communicating with the interior thereof, means associated with each of said cylinders for controlling the volume of fuel mixture admitted thereto, and means associated with the pump for discharging fuel mixture charges therefrom at a substantially constant pressure and volume, said means comprising a by-pass between the exhaust chamber and the intake chamber of said pump adapted to be opened upon a predetermined pressure being reached in the exhaust chamber.

6. In an internal combustion engine comprising a rotatable shaft, a plurality of cylinders arranged in parallel relation to said shaft, a pair of balanced pistons in each cylinder, means for imparting rotary motion to the shaft from the pistons, a pump for compressing the fuel mixture and forcing the same into each cylinder, said pump having a rotor mounted upon said shaft, a casing for said rotor provided with an intake chamber and an exhaust chamber communicating with the interior thereof, said casing being mounted eccentrically with respect to said rotor, said rotor being provided with a plurality of sliding blades adapted to compress and force the fuel mixture taken in through the intake chamber into the exhaust chamber of said pump, a by-pass conduit connecting said exhaust chamber with said intake chamber, spring pressed means for normally closing said by-pass and adapted to be opened upon a predetermined pressure being reached within the exhaust chamber, and means for conducting the fuel mixture from the pump exhaust chamber to the cylinder.

In testimony whereof I affix my signature.

CHESTER McLAREN.